Jan. 1, 1924
J. A. HATFIELD
NUT LOCK
Filed Nov. 12, 1920
1,479,071
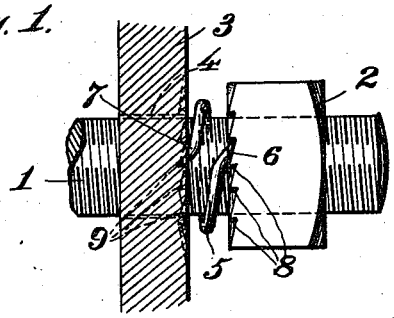
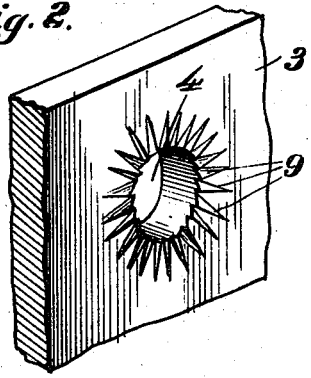
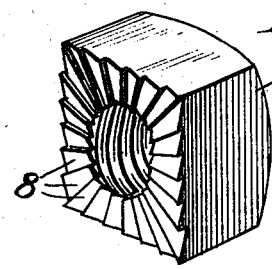
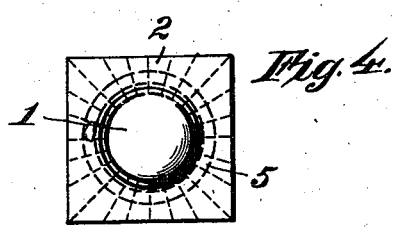
Inventor
John A. Hatfield
By Joshua R. H. Potts
Attorney Patented Jan. 1, 1924.

1,479,071

UNITED STATES PATENT OFFICE.

JOHN A. HATFIELD, OF FORT WORTH, TEXAS.

NUT LOCK.

Application filed November 12, 1920. Serial No. 423,608.

*To all whom it may concern:*

Be it known that I, JOHN A. HATFIELD, a citizen of the United States, residing at Fort Worth, county of Tarrant, and State of Texas, have invented certain new and useful Improvements in Nut Locks, of which the following is a specification.

My invention relates to nut locks, and the object of my invention is to provide an improved nut lock of such construction that the nut cannot possibly become loosened by vibration or shock. A further object of my invention is to provide a device of the character mentioned wherein it shall be practically impossible for any unauthorized person to loosen or remove the nut. Other objects will appear hereinafter.

With these objects in view my invention consists generally in providing a coiled washer having oppositely disposed ends constituting dogs, and in forming the base of the nut with a ratchet face to be engaged by one of the ends of the washer. My invention further consists in a device as mentioned in which the face of the work surrounding the bolt-hole is formed with a plurality of notches constituting a ratchet to be engaged by the opposite end of the washer from that engaging the base of the nut. My invention further consists in various details of construction and arrangements of parts all as will be fully described hereinafter and particularly pointed out in the claim.

My invention will be more readily understood by reference to the accompanying drawings forming a part of this specification and in which—

Fig. 1 is a side elevation of a nut lock embodying my invention,

Fig. 2 is a perspective view of a fragment of the work adjacent the bolt-hole,

Fig. 3 is a perspective view of the nut illustrating the serration or ratchet face on the base, and, Fig. 4 is an end elevation of the assembled device.

Referring now to the drawings, 1 indicates a bolt and 2 the nut threaded thereon. 3 indicates a portion of the work provided with a bolt-hole 4. Interposed between the nut and the work is a coiled washer 5, the ends of which project in opposite directions forming dogs 6 and 7. This washer may be of any particular form but I have illustrated the same as formed of a metal rod.

The nut 2 is provided on its base with a plurality of serrations 8, which are preferably radially disposed, and which together constitute a ratchet face on the base of the nut which is engaged by the end or dog 6 of the washer 5. These serrations may be formed on the nut by any preferred method, that is they may be pressed into the blank when the nut is formed, or they may be subsequently formed therein by a rolling, cutting or stamping. This will be determined by the character and the finish of the work with which the bolt is to be used.

Surrounding and beginning in the bolt-hole 4 in the work 3 are serrations 9 which taper upwardly and outwardly and are also preferably radially disposed, and these may be formed in the work in any preferred manner, as mentioned with relation to the nut. These serrations are preferably oppositely disposed to those on the base of the nut.

In operation the washer is placed over the bolt, closely surrounding the same and the nut threaded upon the latter. As the nut is screwed into position, the washer ends 6 and 7 engage the serrations 8 and 9 respectively and act as dogs on the ratchet faces, the end 7 seating in the tapered serrations 9 well in toward the bolt hole 4. It is obvious that the nut may be freely tightened and as the washer lies well within the periphery of the nut and closely surrounds the bolt, that it is practically impossible to loosen or remove the nut after the same has been screwed into position by the insertion of any instrument between the nut and the work to release the ends of the washer from the serrations.

By disposing the washer well within boundary or periphery of the nut, there is no part projecting that might be struck either by accident or intent, by a moving object or article.

I claim:—

A nut lock comprising in combination, a nut having a threaded bolt opening and ratchet teeth on one face thereof, said ratchet teeth beginning in the bolt opening and extending radially outwardly, a bolt, a work piece having a bolt opening to receive said bolt, and a ratchet on its face surrounding said opening, said ratchet comprising outwardly and upwardly tapering serrations beginning in the said bolt opening of the work piece and extending radially outwardly, and a coiled washer surrounding said bolt and having oppositely projecting ends, one end adapted to engage the ratchet teeth on the nut adjacent the bolt opening thereof, and the other end adapted to the tapered serrations of the work piece adjacent the bolt opening thereof, the entire washer lying well within the periphery of the nut, whereby to prevent accidental disengagement of the ends of the coiled washer.

In testimony whereof I have signed my name to this specification in the presence of two subscribing witnesses.

JOHN A. HATFIELD.

Witnesses:
  H. THOMPSON,
  D. D. HUNTER.